No. 711,917. Patented Oct. 21, 1902.
E. H. WINKES.
STORAGE BATTERY PLATE.
(Application filed Apr. 25, 1902.)
(No Model.) 2 Sheets—Sheet I.
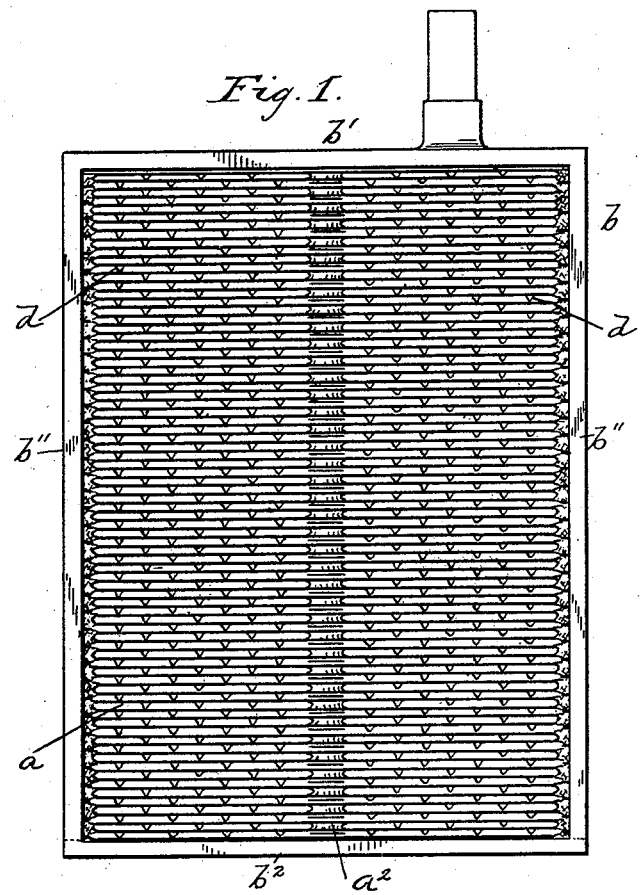
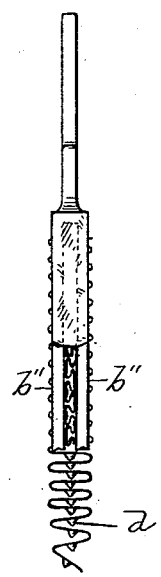
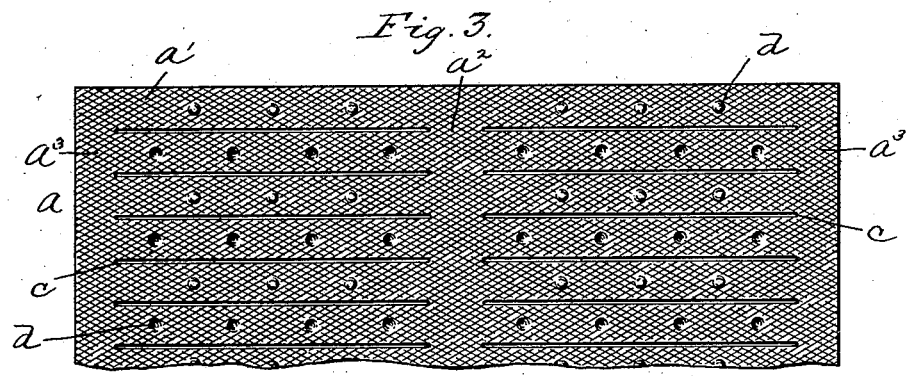
Witnesses:
A. L. Lord.
G. A. Washburn.
Inventor:
Edward H. Winkes.
By Albert Lynn Lawrence,
Attorney.

No. 711,917. Patented Oct. 21, 1902.
E. H. WINKES.
STORAGE BATTERY PLATE.
(Application filed Apr. 25, 1902.)
(No Model.) 2 Sheets—Sheet 2.

Witnesses:
Wm. A. Sinkle
G. A. Washburn.

Inventor:
Edward H. Winkes,
By
Attorney.

UNITED STATES PATENT OFFICE.

EDWARD H. WINKES, OF BUFFALO, NEW YORK, ASSIGNOR, BY MESNE ASSIGNMENTS, OF ONE-HALF TO THE AMERICAN MOTOR CARRIAGE COMPANY, OF CLEVELAND, OHIO, A CORPORATION OF OHIO.

STORAGE-BATTERY PLATE.

SPECIFICATION forming part of Letters Patent No. 711,917, dated October 21, 1902.

Application filed April 25, 1902. Serial No. 104,622. (No model.)

*To all whom it may concern:*

Be it known that I, EDWARD H. WINKES, a citizen of the United States of America, and a resident of Buffalo, in the county of Erie and State of New York, have invented certain new and useful Improvements in Storage-Battery Plates, (Case No. 1,) of which the following is a specification.

My invention relates to improvements in storage-battery plates, and has for its object the provision of a cheaply-made and highly-efficient plate for batteries of this type.

Battery-plates have previously been formed in various ways—as, for example, by grooving relatively thick plates of lead or coiling strips of sheet-lead to provide the necessary surface for exposure to the electrolyte.

My improved battery-plate combines the advantages of both of these types of plates with others peculiar to itself. The active surface of the plate consists, preferably, of a single sheet of lead so formed as to afford the maximum and most efficient exposure thereof to the acid of the battery-cell, and the same is admirably adapted to withstand severe and long-continued service.

I may briefly describe the battery-plate of my invention as consisting of a supporting-frame, preferably of lead and antimony, wherein is mounted a long sheet of lead folded back and forth to present numerous corrugations, which constitute the active surfaces of the plate, said sheet preferably being cut through at each fold for a portion of its width and provided with spacing bosses or projections to separate and support the several folds or cross-strips thus formed.

In effect the plate described consists of a multitude of cross-strips of lead mounted in a surrounding frame in close proximity to each other. By using a properly-formed sheet of lead for this construction, however, the cost of manufacture is extremely low and the plate is very readily assembled and completed. The details of construction of this embodiment of my invention will be more readily understood by referring to the accompanying drawings, wherein—

Figure 4:
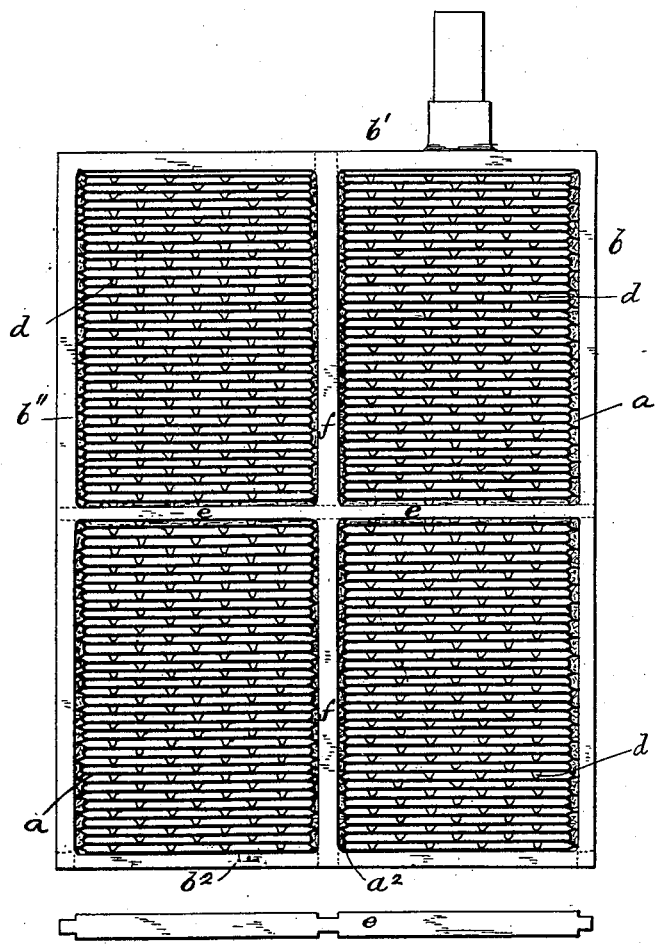
Figure 5:

Figure 1 is a view in front elevation of the improved battery-plate. Fig. 2 is a side view of the upper portion thereof, partially broken away and illustrating the manner of folding and inserting the sheet-lead within the supporting-frame. Fig. 3 shows, upon a somewhat larger scale, a fragment of the prepared sheet of lead previous to folding and inserting it within said frame, Fig. 6 being another fragment of a slightly-different form thereof. Fig. 4 is a view in front elevation of a battery-plate of somewhat-modified form, including a detail of the cross-bar; and Fig. 5 is an end view thereof with the bottom strip broken away.

The same character of reference is employed to designate similar parts in each of the several figures of the drawings.

Figure 6:
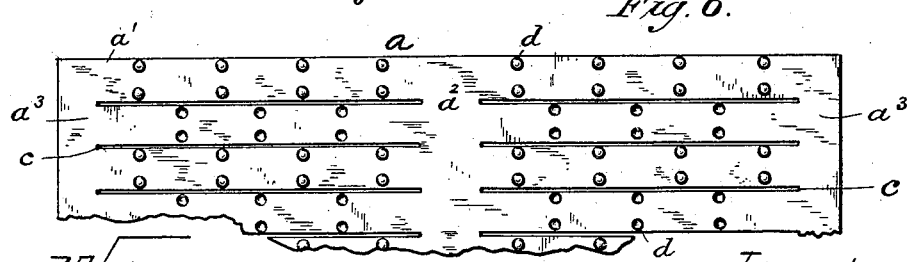

As previously stated, the active portion of my improved battery-plate is formed of sheet-lead, which preferably is chemically pure. This thin lead is cut into sections substantially the width of the battery-plate and of sufficient length to conform when folded to the height of the frame $b$, provided to receive the same. The said frame is made from an alloy of lead and antimony and comprises a top piece $b'$ with its integral terminal lug and bifurcated side pieces $b''$, within which the prepared sheet of lead when folded back and forth is adapted to be slipped into position. A small portion of the latter is shown in Figs. 3 and 6. The section of sheet-lead $a$ is first deeply knurled upon both sides in order to expose the maximum surface to the electrolyte and more securely seat the oxid to be formed thereon. It is then subjected to the action of a cutter or die which makes two series of cuts $c$, extending nearly the entire width of the section, and also embosses and depresses alternating nipples $d$ between the several cuts. This leaves intact a longitudinal center strip $a^2$ and two parallel side strips $a^3$, which maintain the integrity of the section of sheet-lead $a$. The said section is then subjected to a crimping or corrugating device, which folds the same back and forth to form the body of the plate, as illustrated in Figs. 1 and 2. The cross-strips $a'$ thus formed in effect are compacted or closed together as much as desired, an interval of one thirty-second to one-sixteenth of an inch being permissible between these strips. It will of course be understood that more space should be provided between the strips of the positive-pole than those of the negative-pole electrodes. The displaced nipples or projections $d$ upon said strips serve both to separate and support the cross-strips in position within the frame. After crushing or rolling down the corrugated side strips $a^3$ sufficiently to enter readily between the bifurcated or parallel side pieces $b''$ of the frame the section $a$ is placed in the frame, as indicated in Figs. 1 and 2. The bottom piece $b^2$ of said frame is then placed in position, and the exposed edges of the sheet-lead $a$ and the portions of the frame are united by heating or "burning" with a hydrogen-flame, as shown in the upper portion of Fig. 2.

If required, the edges of the completed plate may be trimmed or dressed to present a neater appearance, and the said plate is then ready to be charged or prepared for service in a manner well known to the art.

From the above it will be seen that my improved battery-plate is very readily and cheaply constructed. It combines a maximum of efficiency with a very moderate weight, thus particularly adapting it for service upon motor-vehicles or in other capacities wherein the reduction of weight is an important factor.

The cross-strips are securely supported within the surrounding frame, and being in reality parts of an integral structure and contacting at numerous points throughout their lengths the said strips serve to support each other, thereby lessening the chances of injury to the plates.

In forming or charging battery-plates it is found that they frequently require greater support for the active surface and more strength in the frame than is provided in the plate just described.

Fig. 4 illustrates a battery-plate of slightly-modified form answering such requirements. In this plate the active portion is formed of two shorter sections of lead $a$, cut and folded as before, which are disposed in the frame one above the other, a cross-bar $e$, which is centrally recessed, being slipped into position between said sections, with its tenoned ends inserted in the bifurcated portions $b''$ of the frame. The center strips $a^2$ of said sections are recessed or compressed after the manner of the side strips $a^3$ to afford a seat for the auxiliary supporting-strips $f$ of alloy disposed upon either side of the plate, the cross-bar $e$ also being recessed upon both sides to accommodate these supporting-strips. It will be noticed, too, that the projecting portions or nipples $d$, formed upon the strips $a'$, are in duplicate near the edges thereof, thus supporting the individual strips upon either side and throughout their lengths. The frame, with its cross-bar and supporting-strips and the inclosed lead sections, are then united or burned into a unitary structure, as previously described, thus forming a grid for the relatively fragile portions of the plate adapted to stay the same against swelling or warping during the forming or charging process and support them during the life of said plate.

It is quite apparent that changes in the details of carrying out my invention may readily be made, since I have attempted to set forth herein merely the simplest modes of constructing battery-plates in accordance therewith from an integral sheet of lead, while providing a maximum of active surface in the form of a multitude of separated strips freely accessible to the electrolyte.

I accordingly claim as new, and desire to secure by Letters Patent, the following:

1. A storage-battery plate comprising a supporting-frame and a length of sheet-lead folded or corrugated and cut into numerous closely-spaced and partially-separated strips freely accessible to the electrolyte, said sheet being inserted in, and united with the frame, the folds or corrugations being transverse to the frame, substantially as set forth.

2. In a storage-battery plate, the combination with an integral section of thin lead forming the active portion of the plate, said lead being corrugated and cut or scored in the direction of the corrugations to present numerous closely-spaced strips readily accessible to the electrolyte, of a supporting-frame wherein the section of lead is securely mounted for use in the battery-cell, substantially as set forth.

3. In a storage-battery plate, the combination with a sheet of lead constituting the active portion of the plate, said sheet being corrugated, cut into closely-spaced strips integral with said sheet, and provided with spacing projections, of a surrounding frame wherein the prepared sheet of lead is mounted, and with which it is united, substantially as set forth.

4. In a storage-battery plate, the combination with a frame comprising top and bottom portions and bifurcated side portions wherein the active element of the plate is inserted, of an integral section or length of sheet-lead constituting the active element, said lead being knurled, cut into a plurality of semidetached strips provided with spacing projections and folded or corrugated to fit within the frame; the whole being united in an integral structure, substantially as set forth.

5. A storage-battery plate wherein the active surface is comprised of an integral length of sheet-lead slit or cut through merely, to present numerous closely-spaced strips of active material formed to stay each other but separated substantially throughout their lengths except at their ends, making said strips freely accessible to the electrolyte of the battery-cell, and means for supporting the same within the cell, substantially as set forth.

6. In a storage-battery plate, the combination with an integral sheet or section of lead constituting the active portion of the plate, said sheet being folded or corrugated, cut into series of strips closely spaced and freely accessible to the electrolyte, said strips being integral with a central supporting portion or strip, of a supporting-frame wherein the prepared sheet of lead is mounted, substantially as set forth.

7. In a storage-battery plate, the combination with an integral section of thin lead constituting the active portion of the plate, said section being folded, and cut into series of closely-spaced strips, of a supporting frame or grid wherein the prepared section of lead is mounted, comprising an exterior frame and cross-pieces uniting the exterior portions or sides of the frame, substantially as set forth.

8. In a battery-plate of the class described, the combination with a frame having bifurcated side portions, of an integral section of thin sheet-lead folded and cut into series of closely-spaced strips inserted therein and forming the active portion of the plate, the frame being provided with a cross-bar and central supporting-strips adapted to support the active portion of the plate and stay said frame, all of said portions being united in an integral structure or plate, substantially as set forth.

Signed by me at Cleveland, Ohio, in the presence of two subscribing witnesses, this 5th day of April, A. D. 1902.

EDWARD H. WINKES.

Witnesses:
LORETTA M. MCCRAITH,
ALBERT LYNN LAWRENCE.